Dec. 6, 1966    J. O. WHITE    3,289,304
LINE MEASURING DEVICE
Filed June 14, 1963    2 Sheets-Sheet 1
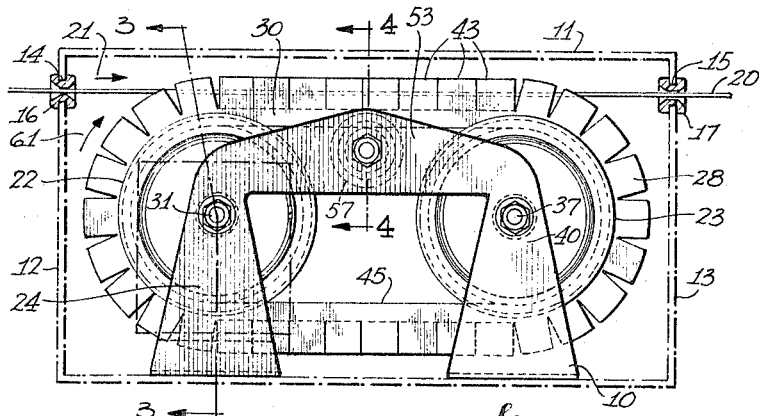
Fig. 1.
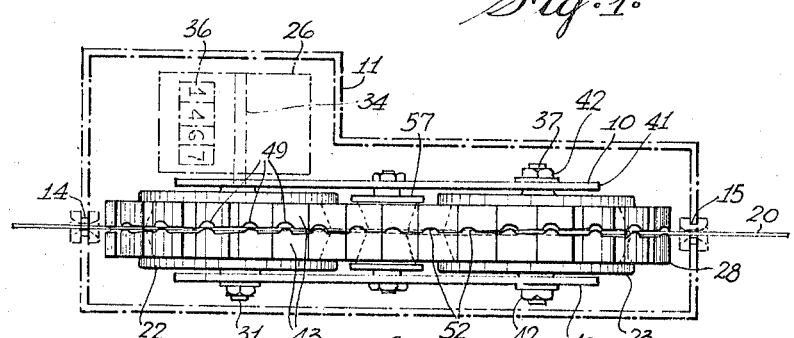
Fig. 2.
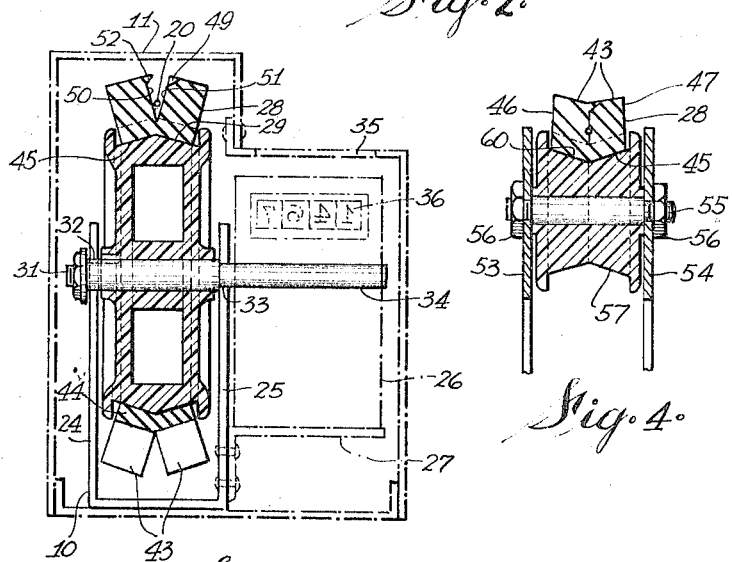
Fig. 3.
Fig. 4.
INVENTOR
Jack O. White
BY
Harvey J. Marshall
PATENT AGENT Dec. 6, 1966      J. O. WHITE      3,289,304
LINE MEASURING DEVICE
Filed June 14, 1963      2 Sheets-Sheet 2
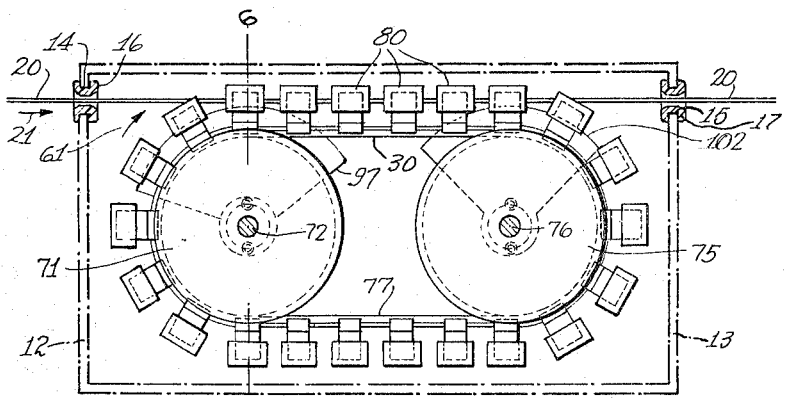
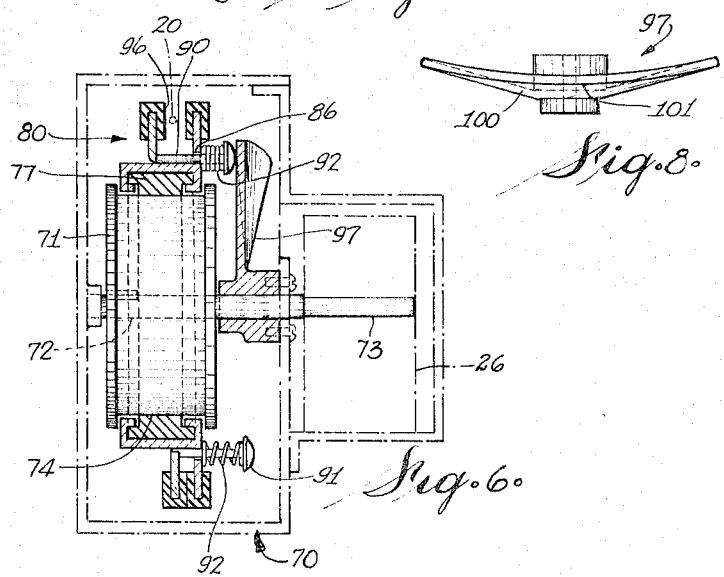
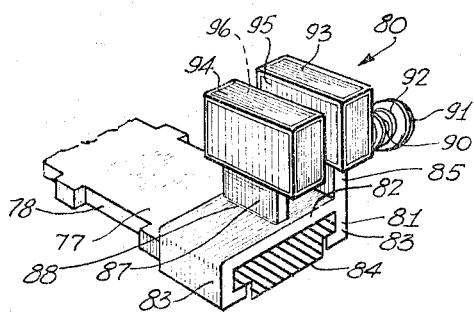
INVENTOR
Jack O. White
BY
Harvey J. Marshall
PATENT AGENT United States Patent Office 3,289,304
Patented Dec. 6, 1966

3,289,304
LINE MEASURING DEVICE
Jack O. White, 280 Kingsway, Welland Junction, Ontario, Canada
Filed June 14, 1963, Ser. No. 288,003
Claims priority, application Canada, May 14, 1963, 875,524
2 Claims. (Cl. 33—134)

This invention relates to a line measuring device and more particularly, to a device for indicating the length of line which has been stripped from a fishing reel.

It is known that fish of a particular species dwell during certain times at a particular depth. Therefore, it is desirable for a fisherman to be able to determine the amount of line which has been let out, and thereby locate his lure at a predetermined depth and return his line to a depth at which a fish has been hooked.

A purpose of the present invention is to provide a device of simple and relatively inexpensive construction which can be mounted on the fishing rod in front of the reel for accurately measuring the line which has been stripped from the reel regardless of the diameter of the reel being used.

According to the present invention, there is provided a frame, guide means supported by the frame and arranged to guide the line past the frame, first and second pulleys mounted for rotation on the frame, and a counter fixed to the frame and arranged to be driven by rotation of one of the pulleys. An endless belt is provided to encircle the pulleys and to be in driving engagement therewith, the belt presenting a flight parallel and adjacent to the line passing the frame between the first and second pulleys. The belt carries a plurality of pairs of first and second transversely disposed jaw members which extend outwardly from the belt and have juxtaposed line engaging surfaces. The first jaw member is fixed to the belt and has a transverse opening formed therein for reciprocably receiving a transverse shaft fixed at one end to the second jaw member to permit sliding movement of the second jaw member toward and away from the first jaw member. The shaft has a head at its outer end, and a compression coil spring surrounds the shaft between the head and the first jaw member to thereby bias the second jaw member towards the first jaw member for gripping the lines between the line engaging surfaces of pairs of the jaw members along the flight. Means are provided for forcing the second jaw member away from the first to a line releasing position during passage of the belt over the pulleys.

The means for separating the gripping members preferably includes rigid cam members fixed to the frame adjacent to the first and second pulleys, the cam members being arranged to be engaged by the head of the shaft and to force the head toward the first jaw member as the belt passes over the pulleys, whereby the spring is compressed and the second jaw member is pushed away from the first jaw member.

In the drawings, which show embodiments of the invention, by way of example,

FIG. 1 is a side elevational view of one embodiment of the line measuring device;

FIG. 2 is a top view of the device of FIG. 1;

FIG. 3 is a cross-sectional view taken along the line 3—3 of FIG. 1;

FIG. 4 is a cross-sectional view of a pulley taken along the line 4—4 of FIG. 1;

FIG. 5 is a side elevational view of another embodiment of the line measuring device;

FIG. 6 is a cross-sectional view of a belt, gripping jaws and a cam member adjacent to one pulley taken along the line 6—6 of FIG. 5;

FIG. 7 is a fragmentary perspective view of the belt and one pair of gripping jaws of the embodiment of FIG. 5 with the gripping jaws separated; and FIG. 8 is a top view of the cam member for the embodiment shown in FIG. 5.

Referring firstly to the embodiment shown in FIGURES 1 to 4, reference character 10 denotes a frame. The frame 10 includes a housing 11 which completely enclosed the working parts of the device. Opposite ends 12 and 13 (see FIGURES 1 and 2) of the housing 11 are provided with aligned openings 14 and 15. Received in the openings 14 and 15 are bushings 16 and 17, respectively, which provide the guide means for guiding a line 20. The device is preferably secured by clamps (not shown) to the fishing rod immediately in front of the reel so that line 20 leaving the reel is guided past the frame in the direction of the arrow 21 by bushings 16 and 17.

A first pulley 22, which is preferably formed of nylon, is fixed to a shaft 31. The pulley 22 has a peripheral belt engaging surface 29, which is convex in transverse cross-section as is shown in FIGURE 3. The shaft 31 is mounted for rotation in openings 32 and 33 in spaced upright members 24 and 25 of frame 10. An end 34 of the shaft 31 extends into and drives an odometer type counter 26 which is fixed to the upright member 25 (see FIGURE 3) by bracket 27. The housing 11 has a window 35 immediately above the counter so that the user can view a reading 36 indicated by the counter.

A second pulley 23, which is also preferably formed of nylon, is mounted for rotation between upright members 40 and 41 of the frame 10 on a shaft 37. The pulley 23 has a belt engaging surface which is convex in cross-section similar to pulley 22. The shaft 37 passes through openings in the upright members 40 and 41 and is secured against rotation by nuts 42, 42 threaded onto its outer ends.

An endless belt 28 encircles the pulleys 22 and 23 and is in driving engagement therewith. The belt 28 presents an upper flight 30 between the pulleys 22 and 23 parallel and adjacent to the line 20 passing the frame 10. Extending outwardly from the belt 28 is a plurality of aligned pairs of gripping members 43. The belt 28 is formed from a continuous band 44 of resilient material such as rubber and the band 44 has an inner pulley engaging surface 45 which is normally flat in transverse cross-section. Each pair of gripping members 43 includes transversely disposed lugs 46 and 47 which are also formed of resilient material and are integral with the band 44. The lugs 46 and 47 are of sufficient depth that the lugs on the flight 30 extend upwardly past the line 20, the lugs 46 and 47 presenting line engaging surfaces 50 and 51 therebetween which normally extend substantially perpendicularly from the band 44. At the outer edge of each lug 46 there is provided a small projection 52 which is integral with the lug 46. A recess 49 is formed in each lug 47 opposite to the projection 52 and is of sufficient size to receive therein the projection 52.

Upright members 24 and 40 and upright members 25 and 41 of the frame 10 are joined at their upper ends by cross members 53 and 54, respectively. A shaft 55 extends between cross members 53 and 54 and is fixed thereto by nuts 56, 56 threaded onto its outer ends. Mounted for rotation on shaft 55 is a third pulley 57. The pulley 57 has a peripheral belt engaging surface 60 which is concave in transverse cross-section as shown in FIG. 4. The pulley 57 is arranged to engage the pulley engaging surface 45 at a point below the upper flight 30.

In operation, the section of the pulley engaging surface 45 which is in contact with the pulley 22 is flexed concavely by the convex belt engaging surface 29 of the pulley 22. The flexing of the band 44 separates all of the lugs 46 and 47 on the section in contact with the pulley as shown in FIG. 3. The line entering the device is guided by bushing 16 into the space between the lugs 46 and 47 on the section of band 44 in contact with the upper portion of pulley 22. As the band 44 leaves the pulley 22, it flexes back to its normal flat shape so that the line engaging surfaces 50 and 51 of lugs 46 and 47 loosely grasp the line 20 therebetween. When the band 44 flexes back to its normal flat shape, the projection 52 of the lug 46 moves into the recess 49 of the lug 47 to ensure that any vibration of the line 20 will not cause it to escape from between the lugs 46 and 47. As the band 44 passes over the pulley 57, the pulley engaging surface 45 is flexed convexly as shown in FIGURE 4 so that the line engaging surfaces 50 and 51 are forced to tightly grip the line 20 therebetween. Thus, the belt is drawn along by the line 20 in the direction indicated by arrows 61 in FIGURE 2 at the speed of the line. As the band 44 moves onto the second pulley 23, the pulley engaging surface 45 is again flexed concavely to spread the lugs 46 and 47, and to thereby permit the line to escape from between the lugs and to travel straight through the bushing 17.

The pulley 22 is driven, of course, by the belt, and therefore, revolves a certain number of times for each foot of line that passes through the device since the belt travels at the same speed as the line. The counter 26 is preferably geared to add a unit to its reading each time the shaft 31 revolves the certain number of times so that the reading indicates in feet the amount of line let out.

When the line is reeled in it travels in a direction opposite to that shown by the arrow 21, i.e. the line enters through bushing 17 and draws the belt in a direction opposite to that shown by arrow 61. As the belt travels in this opposite direction counter 26 is driven in reverse to subtract a unit from its reading for every foot that is reeled in.

In the embodiment as shown in FIGURES 5 to 8, reference character 70 denotes a combined frame and housing which has aligned openings 14 and 15 in its opposite ends 12 and 13. Bushings 16 and 17 are provided in the openings 14 and 15 through which line 20 passes, as in the case of the embodiment shown in FIGURES 1 to 4, in the direction of the arrow 21 (see FIGURE 5) as line is stripped from the reel.

A first pulley 71 is fixed to a shaft 72 which is mounted for rotation within the combined frame and housing 70. An end 73 of the shaft 72 extends into and drives an odometer type counter 26 fixed within the combined frame and housing 70. The pulley 71 has a cylindrical belt engaging surface 74.

A second pulley 75, which is spaced from the first pulley 71, is mounted for rotation on fixed shaft 76 (see FIGURE 5). This second pulley 75 has a cylindrical belt engaging surface similar to the surface 74 of pulley 71.

A flexible endless belt 77 encircles and is in driving engagement with pulleys 71 and 75. As in the case of the previously described embodiment the belt 77 presents an upper flight 30 which is parallel and adjacent to the line 20. The belt 77 is T-shaped in transverse cross-section and is provided with aligned pairs of rectangularly shaped recesses 78 along its outer edges. A plurality of pairs of gripping members 80 are provided along the belt 77. Each pair of gripping members 80 includes a rigid clamp 81. The clamp 81 has a flat top portion 82, which overlies and engages the top of belt 77, and end portions 83 which extend downwardly through the aligned pairs of recesses 78 of the belt and bend under the outwardly extending flanges of the T-shaped cross-section of the belt (see particularly FIG. 7). The bent under parts of the end portions 83 are of less thickness than the web of the T-shaped belt so that the bottom 84 of the web forms the pulley engaging surface of the belt 77.

Integral with the clamp 81 is rigid outwardly extending jaw member 85. The jaw member 85 is located adjacent one edge of the belt 77 and is provided with an opening 86 near the clamp 81. A second jaw member 87 is located on the inner side of jaw member 85. The jaw member 87 engages the top portion 82 of the clamp 81 along its bottom edge 88 and has a transversely extending shaft 90 fixed at its one end thereto (see FIGURE 6). The shaft 90 is slidably received in the opening 86 so that the jaw member 87 can reciprocate towards and away from the fixed jaw member 85. The free end of the shaft 90 is provided with a head 91, and a compression coil spring 92, surrounds the shaft 90 between the head 91 and the jaw member 85 and baises the jaw member 87 towards the jaw member 85. Pads 93 and 94 of resilient material, such as rubber, are fixed over the jaw members 85 and 87, respectively, and define on their inner sides line engaging surfaces 95 and 96.

A rigid cam member 97 is fixed to the combined frame and housing 70 adjacent to the pulley 71 (see FIGURE 6). The cam member 97 presents on its inner side an arcuate surface 100 which is coaxial with pulley 72 and is arranged to be engaged by the head 91 of the shaft 90 of each pair of gripping members 80 as the belt 77 passes around the upper portion of the pulley 71. The arcuate surface 100 is convex, as is best shown in FIG. 8, so that the head 91 first engages the surface 100 when the head is in its fully extended position, but as the head slides along the surface it is pushed inwardly to compress spring 92 and separate jaw members 85 and 87. The head 91 slides over the apex 101 of the arcuate convex surface 100 as it approaches the top of the pulley 72, and at this point the jaws are separate the maximum amount. The surface 100 curves away from the pulley past the apex, so that after the head 91 passes the spring 92 is gradually allowed to expand which forces jaw member 87 back towards jaw member 85. By the time the head 91 leaves the surface 100, the line engaging surfaces 95 and 96 have lightly gripped the line 20, which has been guided therebetween when the jaws were previously held separated by the cam surface 100.

Another rigid cam member 102, which is substantially identical to cam member 97 is fixed to the combined frame and housing 70 adjacent pulley 75 so that the jaw members are again opened as the belt moves onto pulley 75 to release the line which then passes through bushing 17. After the line has been released from between a pair of jaw members the cam permits the jaw members to be returned by the spring 92 to their closed positions.

As the belt is clamped to the line 20 along its upper flight 30 it is drawn in the direction of arrow 61 at the same speed as the line 20, and therefore, the pulley 71 is driven through a certain number of revolutions for each foot of line that passes through the device. The number of feet of line which have passed through the device are registered on counter 26 which is driven by pulley 71.

When the line 20 is being reeled in, it travels in a direction opposite to that indicated by arrow 21. The belt is then drawn in a direction opposite to that indicated by arrow 61. As the belt travels in this reverse direction cam 102 opens the jaw members 85 and 87 as the belt approaches the top of pulley 75 to receive between the jaw member the line entering the device through bushing 17. The jaws are permitted to close as the belt leaves pulley 75 and are reopened by cam surface 100 as the belt moves onto pulley 71 to release the line 20. Thus, the pulley 71 is rotated in a direction opposite to the direction in which it is driven when line is being reeled out so that the counter is driven in reverse to subtract a unit from its reading for every foot of line that is reeled in.

Although the device of the present invention is described as being designed to measure a fishing line, it can be use equally as well for measuring any type of line or cable such as power or communication cable which is being pulled from a storage spool.

I claim:
1. A line measuring device comprising a frame, guide means supported by said frame and arranged to guide the line past said frame, first and second pulleys mounted for rotation on said frame, a counter fixed to said frame and arranged to be driven by rotation of one of said pulleys, an endless belt encircling said pulleys and being in driving engagement therewith, said belt presenting a flight parallel and adjacent to said line passing the frame and between said first and second pulleys, a plurality of pairs of first and second transversely disposed jaw members carried by said belt and extending outwardly therefrom, the jaw members of each pair having juxtaposed line engaging surfaces, said first jaw member being fixed to said belt and having a transverse opening formed therein, said second jaw member having a transverse shaft fixed at one end thereto, said shaft extending through said opening in said first jaw member and being mounted for reciprocation therein to permit sliding movement of said second jaw member toward and away from said first jaw member, said shaft having a head at its other end, a compression coil spring surrounding said shaft between said head and said first jaw member and biasing said second jaw member towards said first jaw member for gripping said line between said line engaging surfaces along said flight, and means for forcing said second jaw away from said first jaw to a line releasing position during passage of said belt over said pulleys.

2. A device as defined in claim 1, wherein said means for moving said gripping members to said second position includes rigid cam members fixed to said frame adjacent to said first and said second pulleys, said cam members being arranged to be engaged by the head of said shaft and to force said head toward said first jaw member as said belt passes over said pulleys, whereby said spring is compressed and said second jaw member is pushed away from said first jaw member.

References Cited by the Examiner
UNITED STATES PATENTS

| | | | |
|---|---|---|---|
| 2,782,516 | 2/1957 | Stoeckel et al. | 33—129 |
| 2,793,440 | 5/1957 | Finkelstein | 33—134 |
| 3,120,892 | 2/1964 | Henning et al. | 198—179 |

LEONARD FORMAN, *Primary Examiner.*

ISAAC LISANN, *Examiner.*

WILLIAM K. QUARLES, JR., *Assistant Examiner.*